United States Patent [19]

Barla

[11] Patent Number: 5,240,426
[45] Date of Patent: Aug. 31, 1993

[54] DECORATIVE ELECTRICAL OUTLET SAFETY COVER

[76] Inventor: John R. Barla, 22046 Rausch, East Point, Mich. 48021

[21] Appl. No.: 897,006

[22] Filed: Jun. 11, 1992

[51] Int. Cl.⁵ ............................................ H01R 13/447
[52] U.S. Cl. .................................... 439/136; 174/67
[58] Field of Search ........................... 439/136–145; 174/67

[56] References Cited

U.S. PATENT DOCUMENTS

| | | | |
|---|---|---|---|
| 3,061,083 | 10/1962 | Hubbell, Jr. | 439/892 |
| 4,293,733 | 10/1981 | Royer | 174/67 |
| 4,342,493 | 8/1982 | Grenell | 339/44 M |
| 4,618,740 | 10/1986 | Ray et al. | 174/67 |
| 4,676,570 | 1/1987 | Pincherri | 439/148 |
| 4,801,271 | 1/1989 | Piper | 439/148 |
| 4,895,527 | 1/1990 | Brown et al. | 439/147 |
| 4,914,265 | 4/1990 | Mongeau | 200/330 |
| 4,952,755 | 8/1990 | Engel et al. | 439/136 |
| 5,009,610 | 4/1991 | Woskow | 439/142 |
| 5,017,148 | 5/1991 | Buckshaw | 439/148 |
| 5,026,299 | 6/1991 | Foulk | 439/145 |

OTHER PUBLICATIONS

Safety 1st Product No. 10401 Literature (date and origin unknown).
"Seal A Sneaky Heat Thief" Product Brochure (date and origin unknown).

Primary Examiner—Neil Abrams
Attorney, Agent, or Firm—J. Gordon Lewis

[57] ABSTRACT

New cover assemblies for electrical fixtures in buildings allow conventional duplex outlets to be inexpensively converted into a variety of different designs and/or colors without changing the electrical infrastructure of the fixture. The cover assemblies each include a cover plate member with an appropriate number orifices, each orifice being underlayed by a shutter which, in a closed position blends with the plate member to conceal the entire outlet while avoiding a large and obtrusive design. Each shutter is manually repositioned between respective open and closed positions through the use of control members carried by the shutters which extend laterally through edge slots formed in side wall members of the cover assembly. Finally, a latching mechanism is provided to securely lock each shutter alternatively in its open and closed positions until released through the application of opposed forces upon spaced pressure points configured for an adult sized hand.

18 Claims, 3 Drawing Sheets

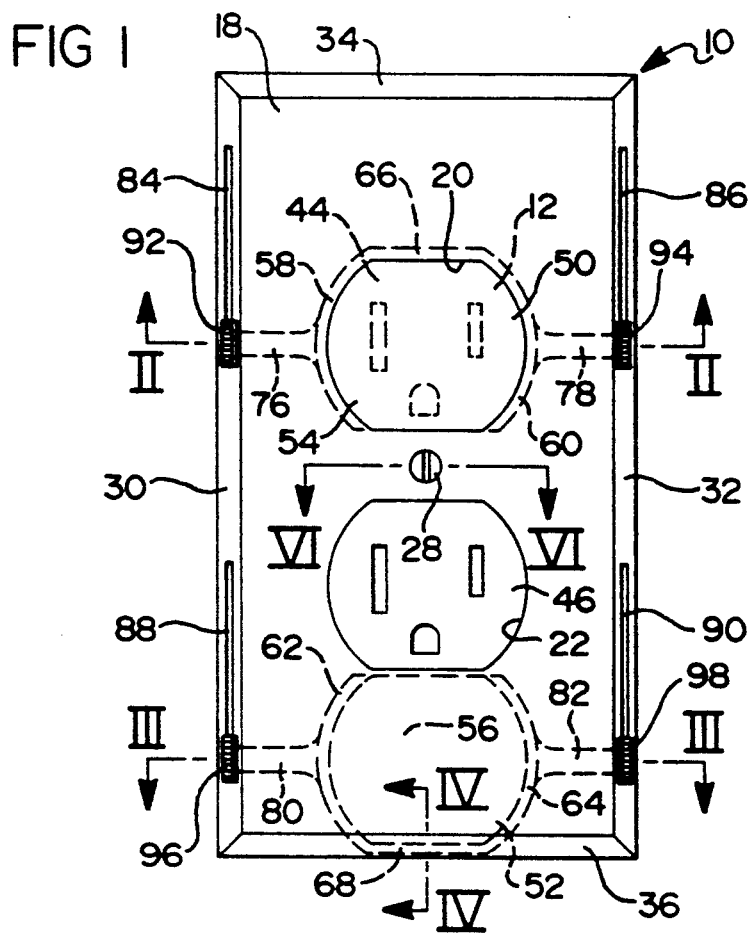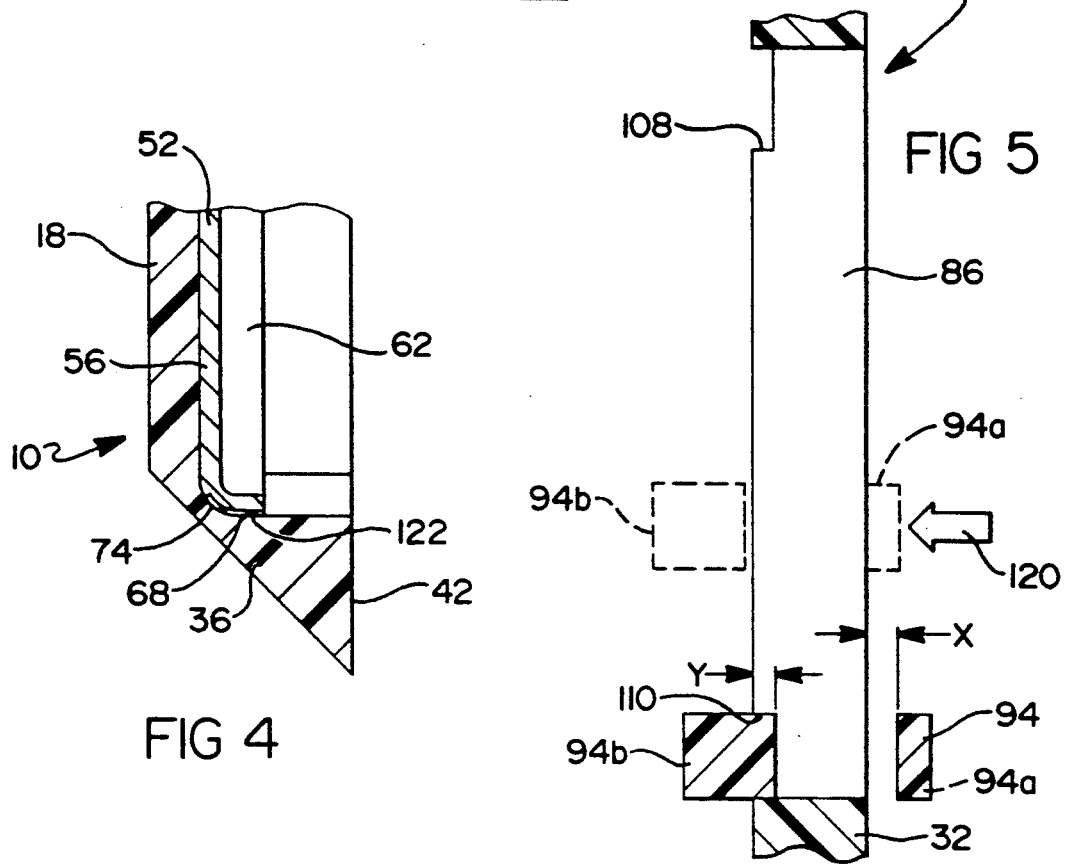

DECORATIVE ELECTRICAL OUTLET SAFETY COVER

INTRODUCTION

The present invention relates to an exterior cover assembly for an electrical outlet which provides decorative design and controlled access to its associated outlet. More particularly, the present invention covers a conventional electrical duplex outlet and renders the outlet unobtrusive and child-resistant.

BACKGROUND OF THE INVENTION

Conventional electrical outlet sockets of standard dimension and configuration are ubiquitous in North America. Generally, such electrical components are affixed in electrical boxes attached to the wall studing so that the outward facing side of the box is approximately flush with the surface of the wall. The outlet most commonly found in North American buildings is a "duplex receptical" (i.e., double outlet) having two faces, each having a characteristic profile generally described as circles cut by parallel cords to give the appearance of rectangles having two opposite rounded ends.

A plate designed to cover such outlets naturally has (in this example) two holes corresponding in size and position to the faces of the outlets. Thus, placement of the cover plate on the wall over the box shields all the unsightly elements of the outlets to provide an attractive finish while allowing access to the outlet sockets. The duplex reciprocal is provided with a standard screw hole in alignment with a corresponding hole in the cover plate. The position of this hole is fixed for a given component. For instance, in the case of a duplex outlet, the screw hole is always centrally positioned equidistant from each hole.

One of the problems encountered by interior designers seeking to modernize or somehow alter the outward appearance of such standard electrical installations, is that the existing infrastructure of the electrical components is so established as to impead substantial design changes to the installation itself. The only viable alternative is to modify the visible portions only of the fixtures in question. In this regard, it has recently become possible to make use of colored cover plates so that a designer may incorporate (for instance) a red duplex reciprocal to suit a room having a red carpet. Unfortunately, in such cases, the "rounded-rectangular" faces of the outlets (being part of the component's infrastructure) remain visible in their original color (usually only brown, green or white) even when a cover plate of different color has been applied. Even if it were possible to obtain a variety of colored duplex reciprocals, changing the color would involve total replacement of the reciprocal, a time-consuming, skilled and expensive operation.

It is clear, therefore, that there is a need to find a means for covering existing interior electrical components in a way which makes use of the existing electrical infrastructure while occluding those portions (normally visible) which would conflict aesthetically with a cover plate of different color or design.

Although various electrical outlet cover plates have been proposed to provide the interior designer with flexibility and aesthetics, many of the proposed designs have been relatively large, so as to cover the entire outlet and/or incorporate complex mechanisms such as doors or hindged panels manually operable between a closed position in which they hide the face of the outlet, to an open position to expose the outlet face for its intended use. A typical such design is described in U.S. Pat. No. 4,914,265 to Francois Mongeau which describes a cover assembly including a pair of manually operable sliders mounted to a front surface of a cover plate. In a design specifically intended for applications with duplex recepticals, the '265 patent describes a cover plate assembly including a cover plate having two standard orifices, one for each outlet and having a standard central screw hole, registerable with the standard screw hole in the outlet unit as well as a slider mounted over each orifice on the front surface of the cover plate, each slider being moveable, relative to the central screw hole, from a proximal to a distal rectilinearly interchangeable position, the orifices being closed when the sliders are at the proximal positions and open at their distal positions. Both the cover plate and sliders define a series of guide surfaces. Finally, a clip retains the guide surfaces in a cooperating relationship to allow guided, reversable, rectilinear displacement of each slider in a plane parallel to the plate from the proximal position to the distal position.

Although devices such as that described in the '265 patent offer aesthetic flexibility independent of the industry dictated infrastructure of electrical recepticals and is of moderate cost, it shares the shortcomings of other prior art designs inasmuch as it is relatively large and obtrusive, extending a substantial distance away from the wall. In a related problem, such cover plates can interfere with the placement of furniture, foot traffic or the like. Lastly, although representing a cost improvement over earlier designs, the cover plate of a '265 patent is still relatively expensive as contrasted with conventional stamped metal or molded plastic cover plates and can be susceptible to damage such as through movement of furniture which could defeat its aesthetic and safety qualities.

A separate but related problem in the design of cover plates for electrical outlets involves providing a degree of child-resistance or limited access to the underlying electrical circuit. Many prior designs have been proposed to control access to the associated electrical outlet. Most typically, a pronged structure, formed of electrically insulating material is provided which can be inserted into the electrical outlet to prevent inadvertent placement of an electrically conductive instrument by a child or unauthorized individual. Such approaches tend to be easily overcome or defeated by simple removal of the temporary insert. Also, the inserts tend to be either loose or connected to the associated cover plate by a flexible tether, such as described in U.S. Pat. No. 4,801,271 to Danny A. Piper to prevent loss thereof. However, such approaches are deemed aesthetically unacceptable for many applications. Furthermore, the flexible tether of many designs tends within a relatively short period of time to imbrittle and fail, exacerbating the limited aesthetic appearance of the cover plate assembly.

BRIEF DESCRIPTION OF THE INVENTION

The present invention provides an exterior cover assembly for an electrical outlet containing an eletrical component such as a duplex receptical wherein the existing electrical infrastructure is retained and yet the normally visible parts of the infrastructure are obscured by the cover assembly. The preferred embodiment of the present invention provides a robust yet inexpensive design which is of simple construction, having an extremely low profile resulting in an unobtrusive appearance which, from a distance, color matches and blends in with the surrounding wall to a large degree. The inventive apparatus includes a generally planar plate member configured for positioning generally parallel and spaced outwardly from a wall supporting an associated electrical outlet. One or more openings are formed in the plate member, each opening having a characteristic circumstantial profile substantially coinciding with an associated plug reciprocal defined by the outlet. A pair of laterally spaced, longitudinally extending side wall members coact with a pair of longitudinally spaced, laterally extending end wall members to circumscribe a plate member and, in application, extend inwardly from the plate member to the wall to substantially fully enclose the outlet opening. A shutter is carried adjacently inwardedly of the plate member for each opening, each shutter slideably displaceable between a closed position underlying an associated opening and an open position. Finally, at least one control member is carried by each shutter which extends laterally toward at least one of the wall members, the control member being operable from a position external of the wall members to effect displacement of the shutters. This arrangement provides the advantage of an inexpensive, aesthetically pleasing and flexible electrical outlet cover.

According to a preferred embodiment of the invention, the decorative safety cover includes means operative to alternatively positively lock the shutter or shutters in their respective open and closed positions. This arrangement provides the advantage of guarding against inadvertent exposure of electrical components which could result in a short circuit condition or other electrical hazard. According to the preferred embodiment of the invention, the decorative safety cover includes a generally planer plate member which is configured for positioning generally parallel to and spaced slightly outwardly from a wall supporting an associated electrical duplex outlet. Two longitudinally spaced openings are formed in the plate member, each having a characteristic circumferential profile substantially coinciding with an associated plug receptical defined by the duplex outlet. A pair of laterally spaced, longitudinally extending side wall members coact with a pair of longitudinally spaced laterally extending end wall members to circumscribe the plate member and, in application, integrally extend inwardly therefrom to the wall to substantially enclose the duplex outlet. An inwardly directed through bore is centrally located on the plate member intermediate the longitudinally spaced openings for interconnection of the cover with the duplex outlet via intermediate fastener means such as a screw. Upper and lower shutters are carried adjacent inwardly of the plate member, each shutter being associated with one of the openings and slideably displaceable between a closed position underlying its associated opening and an open position longitudinally offset from its associated opening. Each shutter defines a generally planer base portion, two parallel laterally opposed side skirt portions and an end skirt portion opposite from the through bore. The skirt portions are integrally formed with the base member. Finally, a pair of laterally opposed control members extend respectively and are integrally formed with each side skirt portion, the control members extending thru longitudinally extending slots in the side wall members, and terminate in slide buttons outwardly of the side wall members. The slide buttons are operable from a position laterally external of the wall members for longitudinal positioning along the slots to effect the above said shutter displacement. This arrangement has the advantage of enhancing a low profile design while permitting structurally robust shutter structure.

According to another aspect of the invention, the control members are integrally formed with the shutter and skirts to provide a simple compact design. Furthermore, the control members are laterally compliant through the use of a localized serpentine structure to provide continuous self-biasing of the shutter toward the plate member as well as laterally outwardly to ensure continuous positive engagement with a side wall members. This arrangement has the advantage of providing an inexpensive, compact, rattle free design and a degree of water resistance.

According to still another aspect of the invention, lock means including at least one inwardly directed detent from each side wall member adjacent the associated slot is disposed for receiving a catch member depending from each associated slide button. Each slide button is thus laterally displaceable from a locked position wherein the associated catch member is disposed partially within each associated detent to a release position in which the associated catch member is disposed laterally inwardly of the associated detent. The outward most portion of the slide buttons are disposed within outwardly opening recesses formed in each of the side wall members. This arrangement has the advantage of requiring release and reposition of the shutter from the closed position to the open position (and vise versa) only by simultaneously grasping the opposed slide buttons of a given shutter and squeezing them toward one another. The dimensions involved in a standard duplex outlet and the resulting positioning of the buttons requires an adult size hand. A child would have a substantial degree of difficulty to effect this displacement.

These and other features and advantages of this invention become apparent upon reading the following specification, which, along with the drawings, describes and discloses preferred and alternative embodiments of the invention in detail.

A detailed description of the embodiments makes reference to the accompanying drawings.

DESCRIPTION OF THE DRAWINGS

FIG. 1, is a front view of a decorative safety cover embodying the present invention in its preferred environment with a duplex electrical outlet;

FIG. 4, is a fragmentary, cross-sectional view, on an enlarged scale, taken on line IV—IV of FIG. 1;

FIG. 5, is a fragmentary, cross-sectional view taken on line V—V of FIG. 2;

DETAILED DESCRIPTION OF THE PREFERRED AND ALTERNATIVE EMBODIMENTS OF THE INVENTION

The terms "above", "below", "vertical", "forward", "rearward", "lateral", "longitudinally", etc. are terms used for descriptive convenience only and are not intended to restrict the generality of the invention which clearly applies to electrical fixtures, however, they may be oriented.

Figure 2:
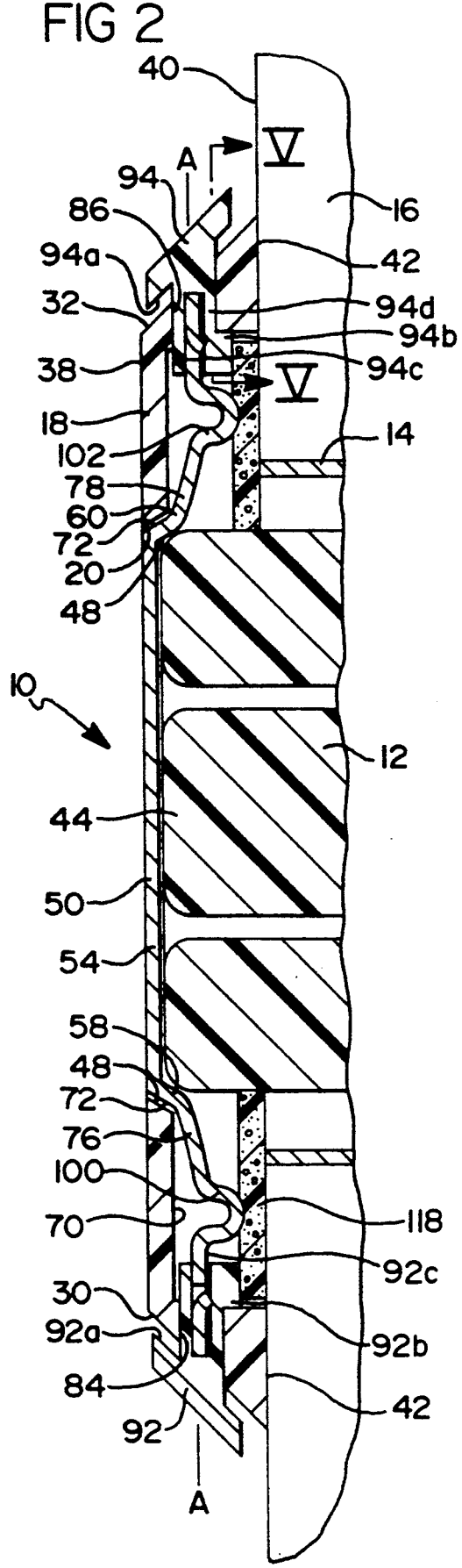
FIG. 2, is a cross-sectional view, on an enlarged scale, taken on line II—II of FIG. 1.
Figure 3:
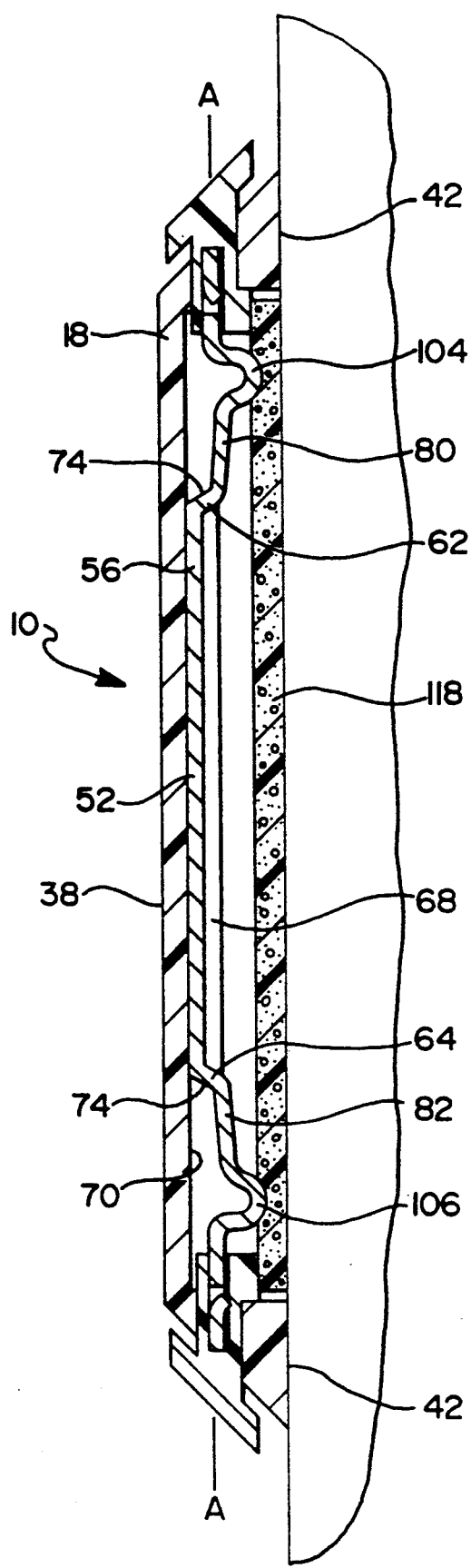
FIG. 3, is a cross-sectional view, on an enlarged scale, taken on line III—III of FIG. 1.

Referring to FIGS. 1 thru 3, the preferred embodiment of a decorative safety cover 10 for electrical outlets is illustrated. In the preferred embodiment, cover 10 is configured for application with a duplex receptical 12 mounted within a flush mount electrical box 14 of an interior wall 16 of a building or structure.

Figure 6:
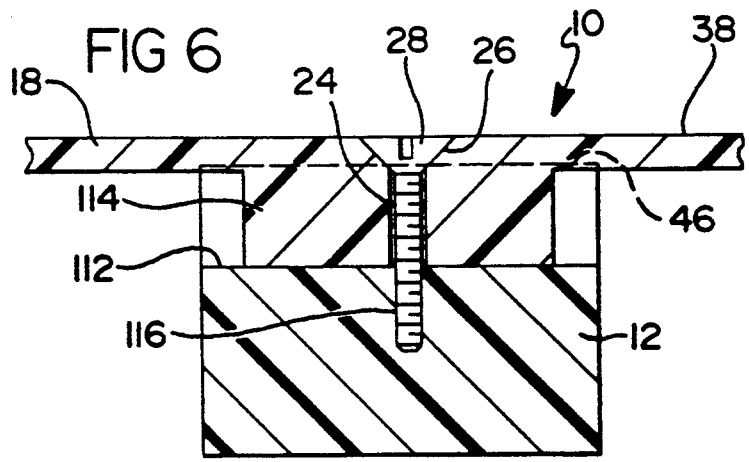
FIG. 6, is a fragmentary, cross-sectional view, on an enlarged scale, taken on line VI—VI of FIG. 1.

Cover 10 comprises a generally rectangular planer plate member 18 defining a pair of spaced symmetrically disposed openings 20, 22 there through. A small through bore 24 (as best seen in FIG. 6) including a flared portion 26 adopted for receiving a flat head machine screw 28 is disposed centrally intermediate openings 20, 22. As best viewed in FIG. 1, a pair of laterally spaced longitudinally extending side wall members 30, 32 extend along the entire vertical dimension of plate member 18. Likewise, upper and lower longitudinally spaced laterally extending end wall members 34, 36 treverse the entire width of plate member 18. Wall members 30 thru 36 are integrally formed with plate member 18 such as by injection molded plastic or other suitable (preferably electrically insulating)material. Plate member 18 forms an outer front face 38 which is disposed substantially parallel to an outer surface 40 of interior wall 16 and is spaced slightly therefrom by the characteristic depth dimension of wall members 30 thru 36. The rear facing surfaces 42 of wall members 30 thru 36 are in a circumferentially abutting relationship with outer surface 40 of interior wall 16 to ensure parallel orientation between face 38 and surface 40.

Openings 20, 22 are configured to be substantially identical to and slightly larger than the characteristic profile of upper and lower duplex outlet faces 44, 46. Duplex receptical 12 and electrical box 14 are of standard design and are assembled by threaded fastners (not illustrated) in the usual manner. Outlet faces 44, 46 extend exteriorly of box 14 and terminate just slightly inwardly of front face 38 and are substantially parallel therewith. Wall members 30 thru 36 are tapered from plate member 18 by approximately 45 degrees to blend in appearance with wall 16. Likewise, openings 20, 22, are tapered at approximately 45 degrees to increase in effective size as they extend rearwardly toward outer surface 40. Specifically, opening 20 is defined by tapered edge surfaces 48 (see FIG. 2). Although not specifically illustrated, opening 22 has similar tapered edge surfaces.

A pair of shutters 50, 52, associated with openings 20, 22, respectively, are carried intermediate plate member 18 and wall 16. Shutters 50, 52 are generally shovel shaped, each including a generally planer base member 54, 56, two generally parallel laterally opposed crescent shaped side skirt portions 58 & 60, 62 & 64 and end skirt portions 66, 68 disposed distal through bore 24. Skirt portions 58 thru 68 are integrally formed with their respective base members 54, 56, preferably from a single piece of flat sheet material such as metal which is die cut and stamped into the illustrated configuration.

As will be described in detail herein below, shutters 50, 52 are each carried adjacent an interior surface 70 of plate member 18 and are manually operable for sliding displacement (verticle, as illustrated in FIG. 1) between a closed position underlying its associated opening and an open position longitudinally offset from its associated opening. In FIG. 2, shutter 50 is illustrated in its closed position and in FIG. 3, shutter 52 is illustrated in its open position.

Skirt portions 58 thru 68 are angled at approximately 45 degrees offset from their respective base members 54, 56, whereby at the points of transition there between, shutter 50 defines tapered edge surfaces 72 (FIG. 2) and shutter 52 defines tapered edge surfaces 74 (FIG. 3). Skirts are deleted on the edge of shutters 50, 52, proximate through bore 24 for reasons which will be described herein below.

Shutters 50, 52 include laterally elongated control members 76 & 78, 80 & 82 integrally formed with and depending from side skirt portions 58 & 60, 62 & 64, respectively, and extending laterally outwardly of cover 10 thru longitudinally extending slots 84 & 86, 88 & 90, respectively. Control members 76 thru 82 terminate in slide buttons 92, 94, 96, and 98, respectively, outwardly of side wall members 30 and 32. The slide buttons 92 thru 98 are operable from a position laterally external of wall members 30, 32 for longitudinal positioning along slots 84 thru 90 to effect displacement of shutters 50, 52.

Referring to FIG. 2, control members 76, 78 define serpentine segments 100, 102 at a central location therealong to provide a degree of lateral resilience or compressability. Likewise, referring to FIG. 3, control members 80, 82, define serpentine segments 104, 106 therealong to provide lateral resilience or compressability. Shutters 50, 52 and control members 76 thru 82 are formed of resilient material such as spring steel whereby segments 100 thru 106 tend to continuously bias slide buttons 92 thru 98 laterally outwardly toward their respective positions as illustrated in FIGS. 2 and 3.

As is best illustrated in FIGS. 2 and 5, the following description exemplifies operation of each of the slide buttons 92 thru 98. Slide button 94 is composed of a central shank portion 94d which extends thru slot 86 and forms a slip fit therewith whereby button 94 is prevented from rocking or rotating with respect to plate member 18 but is relatively free for longitudinal linear displacement along slot 86 as well as lateral displacement through slot 86. At each end of slot 86 a detent 108, 110 is formed within slide wall member 32. The inner end of slide button 94 terminates in a catch member 94b dimensioned to abut the innersurface of side wall member 32 to limit lateral outward displacement of button 94. Furthermore, whenever button 94 is at one of its extreme limits of longitudinal travel within slot 86, catch member 94b extends at least partially within one of the detents 108, 110 thereby locking button 94 in that position. As illustrated in FIG. 5, slide button 94 is illustrated with shutter 50 in its closed position and catch member 94b engaged within detent 110 to effectively lock shutter 50 in its illustrated position.

The outer end of shank 94d terminates in a stop flange 94a which serves to limit lateral inward displacement of slide button 94. Stop flange 94a is spaced from the leading outside edge of slide wall 32 a dimension (x) which slightly exceeds the lateral dimension (y) lateral depth of detents 108 and 110. The laterally innermost end of slide button 94 defines a blind bore 94c which receives the free end of control member 78 and is held in assembly therewith by an interference fit there between or other suitable interconnection. Finally, as best viewed in FIG. 2, upon assembly as illustrated, control member 78 is beam loaded in its illustrated position, meaning that it is manually displaced counterclockwise about tapered edge surface 72.

Each of these slide buttons are constructed and operate substantially as described hereinabove. Referring to FIG. 2, to release shutter 50 from its illustrated closed position, a user would employ two fingers to simultaneously laterally inwardly depress buttons 92 and 94 until stop flanges 92a and 94a abut the outer surface of side wall members 30 and 32 along the displacement axis designated A—A against the self-biasing effect of control members 76 and 78, as indicated by arrow 120 in FIG. 5. This operation will momentarily shorten the effective lateral length of control members 76 and 78. Furthermore, the aforesaid beam loading of control members 76 and 78 will continuously bias shutter 50 toward plate member 18. This effect affords smooth and reliable operation of the mechanism and eliminates rattles. Furthermore, a resilient seal 122 (refer FIG. 4) can be added to either tapered edge surfaces 48 or 72, 74 to provide a water resistant seal. Once released from locking engagement with detents 110 buttons 92, 94 and shutter 50 can be manually repositioned along slots 84, 86. Preferrably, it would be repositioned the entire length therealong and ultimately locked into the open position by engagement with detent 108. During repositioning of shutter 50, stop flanges 92a, 94a slide along the outer longitudinal surfaces of side wall members 30, 32 to prevent inadvertent rotational mispositioning of shutter 50. When in the closed position, shutter 50 nests within opening 20 whereby tapered edge surface 48 defined by opening 20 abuts tapered edge surface 72 defined by shutter 50. Once nested, the outer most surface of base member 54 of shutter 50 is substantial coplaner with front face 38. It is contemplated that the shutters 50, 52 would be painted, coated or otherwise decorated in a color substantially matching that of plate member 18. Thus, when shutter 50 is in the closed position, opening 20 virtually disappears from view of the casual observer rendering the entire cover assembly 10 extremely unobtrusive. The above described nesting of shutter 50 further ensures precise positioning is maintained between shutter 50 and plate member 18 for secure engagement there between.

When shutter 50 is to be displaced from its illustrated closed position to its open position corresponding to the illustrated position of shutter 52 in FIGS. 1 and 3, slide buttons 92 and 94 are pressed laterally inwardly and manually longitudinally displaced along slots 84, 86. Because shutter 50 has no end skirt portion adjacent through bore 24, it will tend to slide cleanly away from open 20 to expose duplex outlet face 44. During said sliding transition, shutter 50 will tend to rotate momentarily (generally about axis A—A), causing a slight torsion of control members 76 and 78. Once shutter 50 is longitudinally clear of outlet face 44, the resilient torsion effect will return face member 54 of shutter 50 to a parallel relationship to plate member 18 corresponding to the position of shutter 52 in FIG. 3. This arrangement permits duplex outlet faces 44, 46 to be positioned very nearly to the front face 38 of plate member 18, resulting in the appearance of "normal" duplex outlet by minimizing optical parallelax when shutters 50, 52 are in their respective open positions.

As best viewed in FIG. 6, typical duplex recepticals 12 have a land 112 formed on the front surface thereof intermediate outlet faces 44, 46 and recessed therefrom. To ensure that plate member 18 is precisely aligned and self-oriented with outlet faces 44, 46, a precision spacing block 114 having a large laterally extending surface area which abuts 1 and 112 both tends to align duplex receptical 12 with plate member 18 and accurately position faces 44 and 46 with respect thereto. Through passage 24 extends through spacing block 114 whereby screw 28 threadably engages and underlying registering blind bore 116 formed centrally in duplex recriprocal 12.

Lastly, a plainer sheet of high density resilent material such as foam rubber 118 is disposed intermediate shutters 50, 52 and outer surface 40 of interior wall 16 to simultaneously provide thermal and sound insulation to cover 10 as well as to slightly resiliently urge control members 76, 78 by the serpentine segments 100, 102 outwardly away from wall 16 to further reduce the chance of rattles eminating from cover assembly 10.

Figure 7:
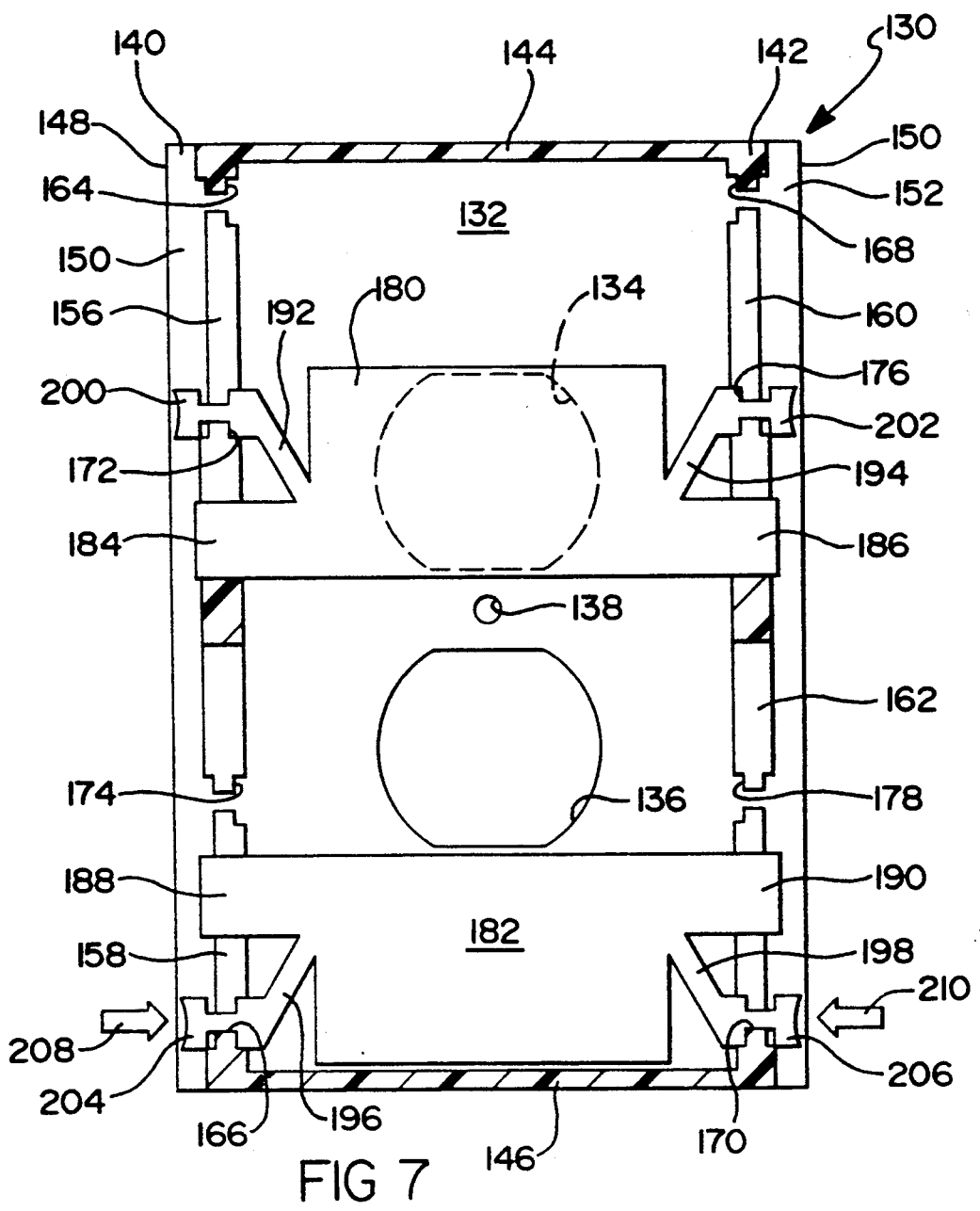
FIG. 7, is a fragmentary, cross-sectional view of an alternative embodiment of the invention.

Referring to FIG. 7, an alternative embodiment of the invention is illustrated. Specifically, a decorative safety cover 130 is configured to enclose a conventional receptical duplex cover (not illustrated). Operation and construction of cover 130 is substantially similar to that of cover 10 described hereinabove. To avoid redundancy, only areas in which cover 130 differs from the above described cover 10 will be described herein. Cover 130 defines a substantially planer plate member 132 which defines spaced openings 134, 136 straddling a central through bore 138. The longitudinal edges of plate member 132 are joined the entire length therealong by side wall members 140, 142. Likewise, the laterally extending edges of plate member 132 are joined along the entire length thereof by end wall members 144, 146. Wall members 140 thru 146 are integrally formed with plate member 132 and extend directly rearwardly (toward the viewer in FIG. 7) at mutual right angles with respect to one another. Laterally extending ledges 148, 150 traverse the longitudinal extent of plate member 132 and, in combination with the outer surfaces of the side wall members 140, 142, define longitudinal recesses 152, 154. Side wall members 140, 142 define longitudal extending slots 156, 158 & 160, 162 which open laterally outwardly therefrom. Slots 156 thru 162 define detents 164, 166, 168 and 170 respectively at the outer most ends thereof and a second set of detents 172, 174, 176 and 178 at the longitudinal central most ends thereof.

A simple pair of shutters 180, 182, formed from generally stiff planer stock material is disposed adjacent the rear surface (facing the viewer in FIG. 7) of plate member 132 and is in continuous sliding contact therewith. Each shutter 180, 182 is linerally slideably displaceable between a closed position overlying a respective opening 134, 136 or longitudinally outwardly displaced therefrom to provide access to an associated duplex reciprocal. Generally rectangular guide extensions 184 & 186, 188 & 190 extend laterally from shutters 180, 182, respectively, and establish a slip fit within their respective slots 156 thru 162. Such an interfit ensures that shutters 180, 182 remain substantially parallel to plate member 132 at all times. Beams 192, 194, 196 and 198 extend along the line of actions substantially parallel to plate member 132 and laterally angled outwardly from a point of juncture between shutters 180, 182 and guide extensions 184 thru 190, respectively. The free ends of beams 192 thru 198 terminate in slide buttons 200, 202, 204 and 206, respectively. Slide buttons 200 thru 206 are configured to be nestingly disposed within their respective detents 162 thru 170 when the shutters 180, 182 are in their open positions or, alternatively, detents 172 thru 178, respectively, when shutters 180, 182 are in there respective closed positions. As illustrated in FIG. 7, shutter 180 is in its closed position shutter 182 is in its open position.

Each slide button 200 thru 206 is configured to be entirely laterally within recess 152, 154 whereby, in application, when viewed from the front side, the buttons are not visable to the casual observer and can only be seen by looking at an angle to the cover 130. In addition to having aesthetic advantages, this features makes it more difficult for a child to slide a shutter 180, 182 from its locked closed position to an open position to thereby expose a live electrical circuit. Specifically, the hand span required to simultaneous pinch opposed button pairs 200 & 200, 204 & 206 together for release from there respected detents would be extremely difficult for a child.

Shutters 180, 182, guide extensions 185 thru 190, beams 192 thru 198, and slide buttons 200 thru 206 are integrally formed from a single element of homogenious material, preferrably injection molded plastic. Likewise, plate member 132 and wall members 140 thru 146 are formed from a single integral piece of homogenious material such as injection molded plastic. An obvious advantage of this design is the extremely low resulting price and simplicity derived from only three separate components.

Although the material used to form shutters 180, 182 is relatively stiff, the thin section of beams of 192 thru 196 renders them resilent and self-biasing. First, once objected to fingertip pressure such as illustrated by arrows 208, 210, beams 196, 198 momentarily deflect inwardly to release the buttons 204, 206 from their respective detents 166, 170, enabling longitudinal repositioning of shutter 182 from its illustrated open position to its closed position. Once placed in the closed position and forces (arrows 208, 210), are removed, the natural resilence of the shutter material will cause beams 196, 198 to spring back to their illustrated position to engage detents 174, 178 to positively lock shutter 182 in its closed position.

It is to be understood that the invention has been described with reference to a specific embodiment and variations to provide the features and advantages previous described and that such embodiments are susceptible of modifications as will be apparent to those skilled in the art. For example, the use of the present invention with non-duplex electrical outlets is contemplated. Furthermore, other higher performance applications (industrial, exterior, marine, aviation) are possible. Lastly, high rate springs could be added to enhance or select a predetermined degree of child resistance. Accordingly, the foregoing is not to be construed in a limiting sense.

What is claimed is:

1. A decorative safety cover for electrical outlets comprising:
    a generally planar plate member configured for positioning generally parallel to and spaced outwardly from a wall supporting an associated electrical outlet;
    one or more openings formed in said plate member, each opening having a characteristic circumferential profile substantially coinciding with an associated plug recepticle defined by said outlet;
    a pair of laterally spaced, longitudinally extending side wall members coacting with a pair of longitudinally spaced, laterally extending end wall members to circumscribe said plate member and, in application, extend inwardly from said plate member to said wall to substantially enclose said outlet;
    a shutter carried adjacently inwardly of said plate member for each said opening, each said shutter slideably displaceable between a closed position underlying an associated opening and an open position;
    at least one control member carried by each said shutter and extending laterally toward at least one of said wall members, said at least one control member operable from a position external of said wall members to effect said displacement; and
    means operative to self-center said shutter with said associated opening when said shutter is in said closed position, said self-centering means comprising cooperating angled surfaces defined by circumferential edges of said shutter and said associated opening.

2. The safety cover of claim 1, further comprising means operative to continuously bias said shutter toward said plate member.

3. The safety cover of claim 1, further comprising means operative to alternatively positively lock said shutter in said open and closed positions.

4. The safety cover of claim 1, wherein said at least one control member is laterally compliant.

5. The safety cover of claim 1, wherein said control member extends laterally slightly outwardly of at least one of said wall members.

6. The safety cover of claim 1, wherein a laterally outwardmost portion of said control member terminates in a slide button.

7. The safety cover of claim 1, further comprising means operative to self-orient and maintain said plate member in a fixed spacing from said electrical outlet.

8. The safety cover of claim 1, further comprising a generally rearwardly directed skirt portion integrally formed with each said shutter and extending around approximately three-quarters of the circumference thereof.

9. The safety cover of claim 1, wherein each said shutter and associated control members are integrally formed, each said control member comprising at least one laterally resilient engagement portion operative for selective engagement with an associated wall member and at least one substantially rigid guide portion operative to maintain positional alignment of said shutter and plate member.

10. A decorative safety cover for electrical outlets comprising:
    a generally planer plate member configured for positioning generally parallel to and spaced outwardly from a wall supporting an associated electrical duplex outlet;
    two longitudinally spaced openings formed in said plate member, each having a characteristic circumferential profile substantially coinciding with an associated plug recepticle defined by said duplex outlet;
    a pair of laterally spaced, longitudinally extending side wall members coacting with a pair of longitudinally spaced, laterally extending end wall members to circumscribe said plate member and, in application, integrally extend inwardly from said plate member to said wall to substantially fully enclose said duplex output;

an inwardly directed through bore centrally located on said plate member intermediate said longitudinally spaced openings for interconnection of said cover with said duplex outlet via intermediate fastener means;

upper and lower shutters carried adjacently inwardly of said plate member, each shutter associated with one of said openings and slideably displaceable between a closed position underlying said associated opening and an open position longitudinally offset from said associated opening, each shutter defining a generally planer base member, two parallel laterally opposed side skirt portions and an end skirt portion disposed distal said through bore, said skirt portions integrally formed with said base member; and lateraly opposed control members extending respectively from and integrally formed with said side skirt portions, said control members passing through longitudinally extending slots in said side wall members terminating in slide buttons outwardly of said side wall members, said slide buttons operable from a position lateraly external of said wall members for longitudinal positioning along said slots to effect said shutter displacement.

11. The safety cover of claim 10, wherein said control members are operative to continuously bias said respective shutter toward said plate member.

12. The safety cover of claim 11, wherein said control members are laterally elongated and are laterally resilient.

13. The safety cover of claim 12, wherein each said control member comprises a localized serpentine portion at a location therealong laterally intermediate said associated slide button and shutter to continuously bias said associated button laterally outwardly.

14. The safety cover of claim 13, further comprising means operative to alternatively positively lock said shutter in said open and closed positions, said lock means including at least one inwardly directed detent formed in each said side wall member adjacent said associated slot for receiving a catch member depending from said associated slide button.

15. The safety cover of claim 13, wherein each said slide button is laterally displaceable from a locked position wherein said associated catch member is disposed at least partially within said associated detent to a release position in which said associated catch member is disposed laterally inwardly of said associated detent.

16. The safety cover of claim 10, wherein each said slide button is substantially disposed within an outwardly opening recess formed in said side wall members.

17. The safety cover of claim 10, further comprising a planer sheet of resilient, sound absorbing material disposed intermediate said shutters and supporting wall operative to slightly continuously bias said shutters away from said wall.

18. A decorative safety cover for electrical outlets comprising:

a plate member defining a generally planer exterior surface and an interior surface, said plate member configured for positioning generally parallel to and spaced outwardly from a wall supporting an associated electrical outlet;

one or more openings formed in said plate member, each opening having a characteristic circumferential profile substantially coinciding with an associated plug recepticle defined by said outlet;

a pair of laterally spaced, longitudinally extending side wall members coacting with a pair of longitudinally spaced, laterally extending end wall members to circumscribe said plate member and, in application, extend inwardly from said plate member to said wall to substantially enclose said outlet;

a generally planer shutter carried adjacent said plate member for each said opening, each said shutter having a planer outer surface and a characteristic circumferential profile substantially coinciding with that of an associated opening, each said shutter slideably displaceable between a closed position wherein said shutter outer surface is substantially coplaner with said plate member exterior surface and an open position wherein said shutter is offset from said associated opening and said shutter outer surface is adjacent said plate member interior surface; and at least one control member carried by each said shutter and extending laterally toward at least one of said wall members, said at least one control member operable from a position external of said wall members to effect said displacement.

* * * * *